US006825714B2

United States Patent
Greene et al.

(10) Patent No.: US 6,825,714 B2
(45) Date of Patent: Nov. 30, 2004

(54) MULTICHANNEL INTERFEROMETER WITH PHASE GENERATED CARRIER DEMODULATION AND QUADRATURE ERROR CORRECTION

(75) Inventors: Paul Louis Greene, La Crescenta, CA (US); William Christopher Knaack, West Hills, CA (US); Gregory Alan Gibbons, Thousand Oaks, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 130 days.

(21) Appl. No.: 10/333,695

(22) PCT Filed: Jul. 24, 2001

(86) PCT No.: PCT/US01/23360

§ 371 (c)(1), (2), (4) Date: Jan. 22, 2003

(87) PCT Pub. No.: WO02/47343

PCT Pub. Date: Jun. 13, 2002

(65) Prior Publication Data

US 2004/0145798 A1 Jul. 29, 2004

Related U.S. Application Data

(60) Provisional application No. 60/220,266, filed on Jul. 24, 2000.

(51) Int. Cl.[7] ............................................... H04R 1/44
(52) U.S. Cl. ...................... 329/304; 367/149; 250/227
(58) Field of Search ................................ 329/304, 306, 329/307; 367/149, 153; 250/227, 200

(56) References Cited

U.S. PATENT DOCUMENTS

| | | | | | |
|---|---|---|---|---|---|
| 4,486,657 A | * | 12/1984 | Bush | ...................... | 250/227.19 |
| 5,227,857 A | * | 7/1993 | Kersey | ...................... | 356/477 |
| 5,589,937 A | * | 12/1996 | Brininstool | .................. | 356/480 |
| 6,363,034 B1 | * | 3/2002 | Varnham | ..................... | 367/149 |
| 6,580,959 B1 | * | 6/2003 | Mazumder | .................. | 700/121 |

* cited by examiner

Primary Examiner—Robert Pascal
Assistant Examiner—Joseph Chang
(74) Attorney, Agent, or Firm—Lynn & Lynn

(57) ABSTRACT

Apparatus for eliminating sign uncertainty in a coherent phase generated carrier demodulator in a multi-channel sensor system has a downconverter array arranged to separate the in-phase component I and the quadrature phase component of the sensor output for each channel. A coordinate transformer uses the in-phase component and quadrature phase component to calculate an arctangent for the phase angle for each channel. A digital signal processor adds 180° to each arctangent calculation for which the tangent is a negative number.

19 Claims, 6 Drawing Sheets

MULTICHANNEL INTERFEROMETER WITH PHASE GENERATED CARRIER DEMODULATION AND QUADRATURE ERROR CORRECTION

CROSS REFERENCE TO RELATED APPLICATION

This applicants is a 371 of PCT/US01/23360 Jul. 24, 2001 which claim the benefit of U.S. Provisional Application Ser. No. 60/220,266, filed Jul. 24, 2000 for System for Determining Phase Offset in a Numerically Controlled Oscillator to Eliminate Sign Uncertainty in a Phase Generated Carrier Demodulator.

BACKGROUND OF THE INVENTION

This invention relates generally to signal processing techniques for fiber optic sensor systems. This invention relates particularly to demodulation of signals output from an array of fiber optic interferometric sensors for determining changes in a physical parameter measured by the individual sensors. Still more particularly, this invention is directed to determining the phase offsets in a numerically controlled oscillator for the fundamental carrier and carrier first harmonic in order to eliminate the sign uncertainty in a coherent phase generated carrier demodulator.

Mismatched fiber optic interferometers are commonly used as sensing elements in fiber optic sensor arrays for measuring changes in a parameter such as fluid pressure, acceleration, magnetic field intensity, etc. Such sensing elements measure the time-varying phase delay between optical signals that have propagated along separate optical paths having unequal path length.

Mixing between a reference signal and a data signal is often necessary to extract information from an optical carrier. In interferometric sensing the mixing is typically between a reference signal and a signal whose phase has been modified, or modulated by the parameter being measured.

Modulation is commonly used to transmit information from an information source, such as a sensor system where information is detected, to an information destination, such as a receiver system where detected signals are received and processed. According to conventional modulation techniques, a signal of interest detected by a sensor modulates a carrier signal by modifying one or more characteristics of the carrier signal, such as amplitude, frequency or phase, to form a modulated carrier signal. The modulated carrier signal is then more easily transmitted over the appropriate communication channels to the destination or receiver system where the modulated carrier signal is demodulated to recover the signal of interest.

The fiber optic sensors detect or sense signals that modulate the output phase of the sensor system or interferometer. The modulated carrier can then be transmitted to a receiver system and photodetected. In a system having an array of sensors, the signals are often multiplexed, for example, using time division multiplexing (TDM) and/or wavelength division multiplexing (WDM), as well as frequency division multiplexing (FDM).

Fiber optic sensor systems acquire in the demodulation process one term proportional to the sine of the sensor phase shift and another term proportional to the cosine of the sensor phase shift. The sine of the sensor phase shift is referred to as the quadrature term, Q; and the cosine of the sensor phase shift is referred to as the in-phase term, I. The angle of the phase shift is determined by calculating the ratio I/Q, which is the arctangent of the sensor phase shift. The amplitudes of the sine and cosine terms must be set equal by a normalization procedure to ensure accurate implementation of an arctangent routine to determine the sensor phase shift.

One type of modulation technique used in interferometers and other sensing systems involves the use of phase generated carriers. The time varying phase signal (signal of interest) of each sensor modulates the phase generated carriers to form modulated carriers. Both the signal of interest and the phase generated carriers can be mathematically represented as a Bessel series of harmonically related terms. During modulation, the Bessel series of the signals of interest modulates the Bessel series of the phase generated carriers. The number of terms in the Bessel series of the resulting modulated carriers will be dependent upon the amplitude of the measured or detected signals of interest. The harmonically related terms in the Bessel series of the modulated carriers represent both the measured or detected signals of interest and the carrier signals.

Typical fiber optic sensor systems using phase generated carriers to transmit a detected or measured signal (signal of interest) to a receiver system have used a pair of quadrature carriers with frequencies of either $\omega_c$ and $2\omega_c$ or $2\omega_c$ and $3\omega_c$, where $\omega_c$ is the phase generated carrier frequency. In multiplexed sensor systems, the sensor sampling frequency $f_s$ must be selected to ensure that frequencies greater than $f_s/2$ are not aliased into the band of interest below $f_s/2$.

In some systems the optical signal input to the interferometer is a phase generated carrier produced by producing time-dependent variations in the frequency of the optical signal output by a laser. A phase generated carrier may be produced by various techniques. One such technique involves routing the source output through a phase modulator and applying a sequence of separate and different linear ramp voltages to the linear phase modulator to produce step changes in the optical frequency.

In some systems the optical signal input to the interferometer is a phase generated carrier produced by generating time-dependent variations in the frequency of the optical signal output by a laser. A phase generated carrier may be produced by various techniques. One technique involves routing the laser source output through an external phase modulator and applying a sequence of separate and unique linear ramp voltages to the linear phase modulator to produce step changes in the optical frequency.

Another technique for producing a phase generated carrier uses sinusoidal phase modulation of the source signal. Instead of sampling signals associated with separate optical frequencies, the sampling of signals is associated with integration over portions of a period of the phase generated carrier.

Still another technique for producing a phase generated carrier involves the use of a Direct Digital Synthesizer (DDS) containing a numerically controlled oscillator (NCO). In particular, carriers that are 180° out of phase with the NCO phase will produce sensor responses with opposite sign after demodulation different than those produced by carriers that are in phase with the NCO phase in the DDS. When coherently combined, sensor responses with opposite signs will combine destructively, which results in an attenuation of the combined output and a reduction in overall system dynamic range.

SUMMARY OF THE INVENTION

The present invention significantly increases the dynamic range of the coherent phase generated carrier demodulator by reducing signal attenuation that is caused when individual sensor responses of opposite sign in a synchronous environment are coherently combined.

Apparatus according to the invention for reducing sign uncertainty in a coherent phase generated carrier demodulator in an interferometric acoustic sensor system, comprises an optical signal source that provides a phase generated carrier signal to the acoustic sensor system so that the multi-channel acoustic sensor system produces an acoustic signal that is superimposed on the phase generated carrier signal, the interferometric acoustic sensor system being arranged to provide an optical signal output that includes the phase generated carrier signal and the acoustic signal. The invention further comprises a photodetector arranged to receive the optical signal output from the interferometric acoustic sensor system and a downconverter connected to the photodetector. The downconverter is arranged to separate an in-phase component I and a quadrature component Q of the acoustic signal from the phase generated carrier signal. The invention also includes a coordinate transformer connected to the downconverter. The coordinate transformer is arranged to function as a rectangular to polar converter and provide signals indicative of a polar phase angle between the in-phase component I and the quadrature phase component Q of the acoustic signal.

A method according to the invention for eliminating sign uncertainty in a coherent phase generated carrier demodulator in a multi-channel sensor system comprises the steps of arranging an optical signal source to provide a phase generated carrier signal to the multi-channel acoustic sensor system so that the multi-channel acoustic sensor system produces in each channel an acoustic signal that is superimposed on the phase generated carrier signal and connecting an array of downconverters to the photodetector array. The method further comprises the steps of arranging the array of downconverters to separate an in-phase component I and a quadrature component Q of the acoustic signal from the phase generated carrier signal in each channel and connecting a coordinate transformer to the array of downconverters. The method also includes the step of arranging the coordinate transformer to function as a rectangular to polar converter and provide signals that indicate a polar phase angle between the in-phase component I and the quadrature phase component for each channel.

The invention preferably further comprises the steps of adjusting a phase register in each downconverter in a predetermined number of phase intervals starting at 0° and ending at 180° and sampling signals output from each channel of the sensor system a predetermined number of times for each phase interval. The method also preferably includes the steps of saving maximum values of the in-phase component I and the quadrature phase component Q, saving phase values that correspond to the maximum values of the in-phase component I and the quadrature phase component Q, and setting each downconverter to the phase value that produced the stored maximum values of the in-phase component I and the quadrature phase component Q for the corresponding channel.

The invention preferably also further comprises the steps of calculating the difference of successive squares of Q to determine a quantity $D_Q=(Q_i)^2-(Q_i-1)^2$, calculating the difference of successive squares of Q to determine a quantity $D_I=(I_i)^2-(I_i-1)^2$, summing the quantities $D_Q$ and $D_I$ to determine a sum term $D_{Qs}$ and a sum term $D_{Is}$, calculating a quantity $$R = \left(\frac{D_{Qs}}{D_{Is}}\right)^{0.5},$$

adjusting the phase generated carrier gain by an amount proportional to 1−R; and repeating the preceding steps until R≦0.1.

The invention preferably further comprises the steps of sampling signals output from each channel of the sensor array a predetermined number of times, saving the maximum values of Q and I, calculating the ratio $R_t$ of the maximum value of Q to the maximum value of I, and adjusting the signals Q and I if the ratio of their maximum values differs from unity.

An appreciation of the objectives of the present invention and a more complete understanding of its structure and method of operation may be had by studying the following description of the preferred embodiment and by referring to the accompanying drawings.

DETAILED DESCRIPTION OF THE INVENTION

Figure 1:
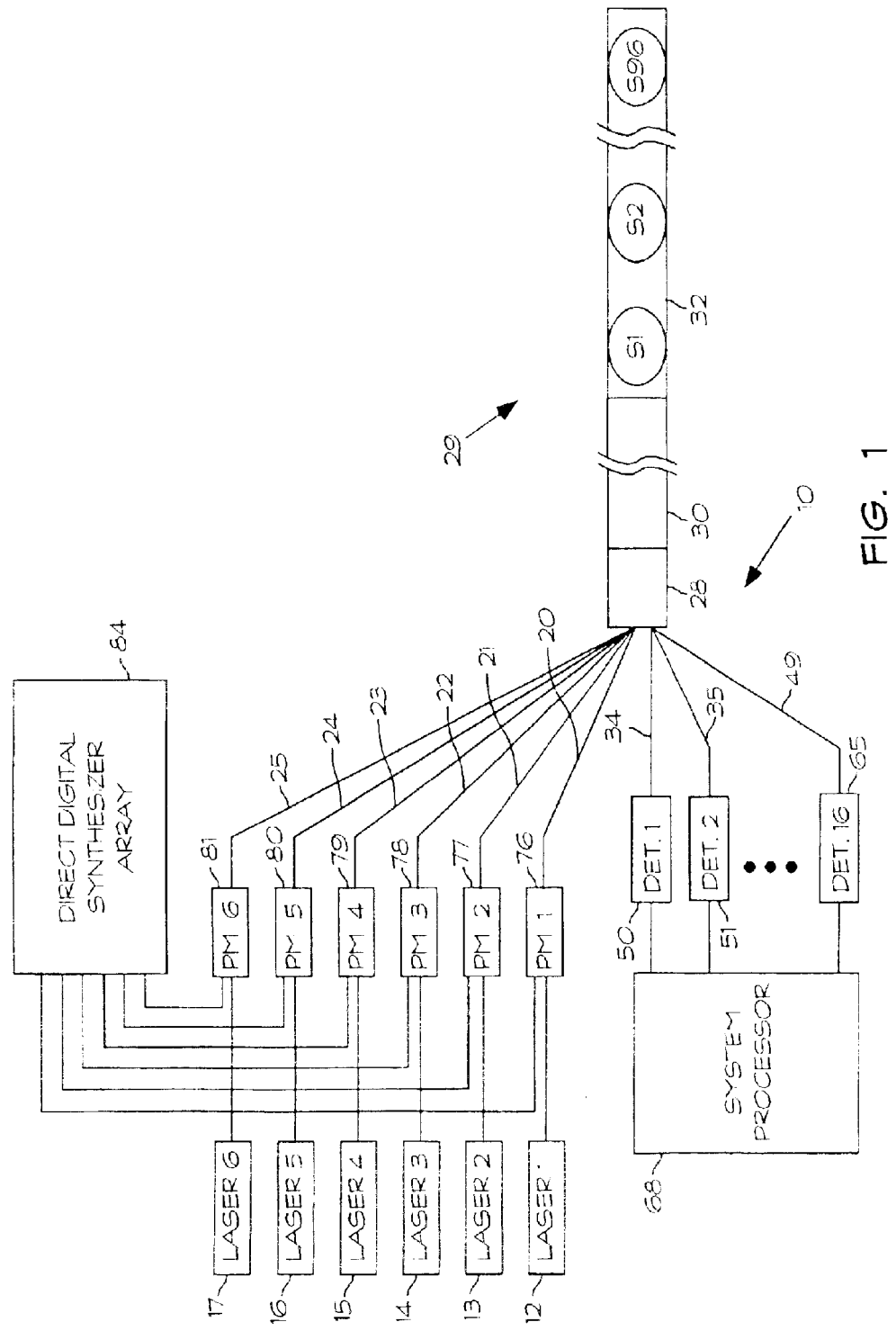
FIG. 1 illustrates a fiber optic sensor system.

This invention is directed to a signal processing algorithm for processing signals output from a sensor. FIG. 1 illustrates a multi-channel fiber optic sensor system 10 with which the algorithm according to the present invention may be used. The algorithm according to the present invention may be used with other sensor architectures (not shown) and with other polarization diversity detectors (not shown). The particular fiber optic sensor system 10 is disclosed herein only to provide an example of such apparatus that may be used with the invention.

The fiber optic sensor system 10 is fully disclosed in U.S. patent application Ser. No. 09/429,048, filed Oct. 29, 1999 and assigned to Litton Systems, Inc., assignee of the present invention. The fiber optic sensor system 10 is also fully disclosed in U.S. patent application Ser. No. 09/430,057, filed Oct. 29, 1999 and assigned to Litton Systems, Inc.

The fiber optic sensor system 10 includes a plurality of lasers 12–17 arranged to supply a plurality of corresponding optical feed lines 20–25. The optical feed lines are joined at an optical terminator 28 that is connected to a fiber optic sensor array 29. The optical terminator 28 is connected to a downlead cable 30, which is connected to an acoustic array cable 32. The acoustic array cable 32 houses a plurality of sensors, which in this exemplary embodiment total ninety-six and are designated S1–S96. The optical terminator 28 also provides a link between the downlead cable 30 and a plurality (e.g., 16) of return fibers 34–49, which are arranged to provide optical signals to corresponding tricell photodetectors 50–65. The outputs of the tricell photodetectors 50–65 are electrically connected to a system processor 68.

A plurality of phase modulators 76–81 are arranged to modulate the optical signals output from the lasers 12–17, respectively. Each of the lasers 12–17 generates an optical signal having a different optical wavelength. Preferably, the phase modulators 76–81 are each characterized by a different modulation frequency. Accordingly, the lasers 12–17 produce six optical signals, each having different optical wavelengths and each modulated at a separate modulation frequency.

Figure 2:
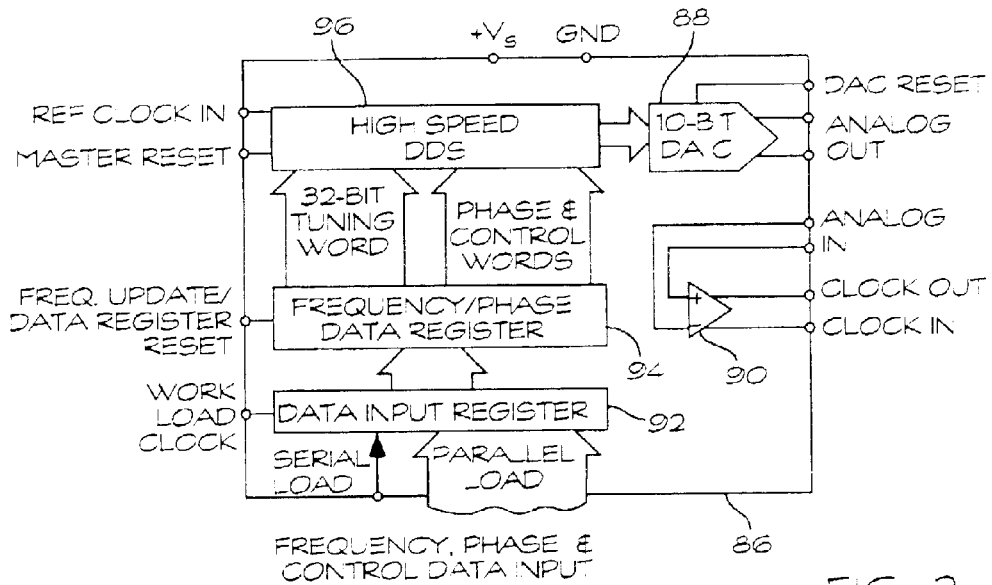
FIG. 2 is a block diagram of a direct digital synthesizer that may included in the fiber optic sensor system of FIG. 1.

A direct digital synthesizer (DDS) array 84 provides oscillatory signal inputs having frequencies $f_1$–$f_6$ to the phase modulators 76–81, respectively. Analog Devices AD9850 CMOS 125 MHz DDS is suitable for use in the present invention. The basic structure of a DDS 84 is shown in FIG. 2. As shown in FIG. 2 a data input register 92 receives serial and parallel load inputs, which are input to a frequency/phase data register 94 under the control of a work load clock signal. The frequency/phase data register 94 produces a 32-bit tuning word and phase and control words that are input to a high speed DDS 96 under the control of a frequency update data register reset signal. The high speed DDS 96 receives reference clock in and master reset signals and provides an output to a digital to analog converter (DAC) 88 that is arranged to provide an analog signal output. The DDS array also includes a comparator 90 that receives analog inputs and provides clock out signal. The DDS 84 is a highly integrated device that uses advanced DDS technology coupled with the internal high speed, high performance, digital to analog (D/A) converter 88 and the comparator 90 to form a complete digitally programmable frequency synthesizer and clock generator. The DDS 86 is used to generate a spectrally pure, frequency/phase programmable analog sine wave.

As shown in FIG. 1, there are six phase modulators 76–81 connected to the DDS array 84. Accordingly, the array 84 includes the DDS 84 and five additional DDS's (not shown) that are identical in structure to the DDS 84. The DDS array 84 drives the phase modulators 76–81 to provide six phase generated carriers that are input to the sensor array 29.

The sensors S1–S96 may be formed as Michelson interferometers (not shown) or Mach-Zehnder interferometers (not shown) that produce interference patterns in response to a changes in a parameter being monitored by the sensor system 10. For example the parameter may be acoustic pressure. The prior art is replete with examples of such fiber optic interferometric sensors used to monitor physical parameters.

Figure 3A:
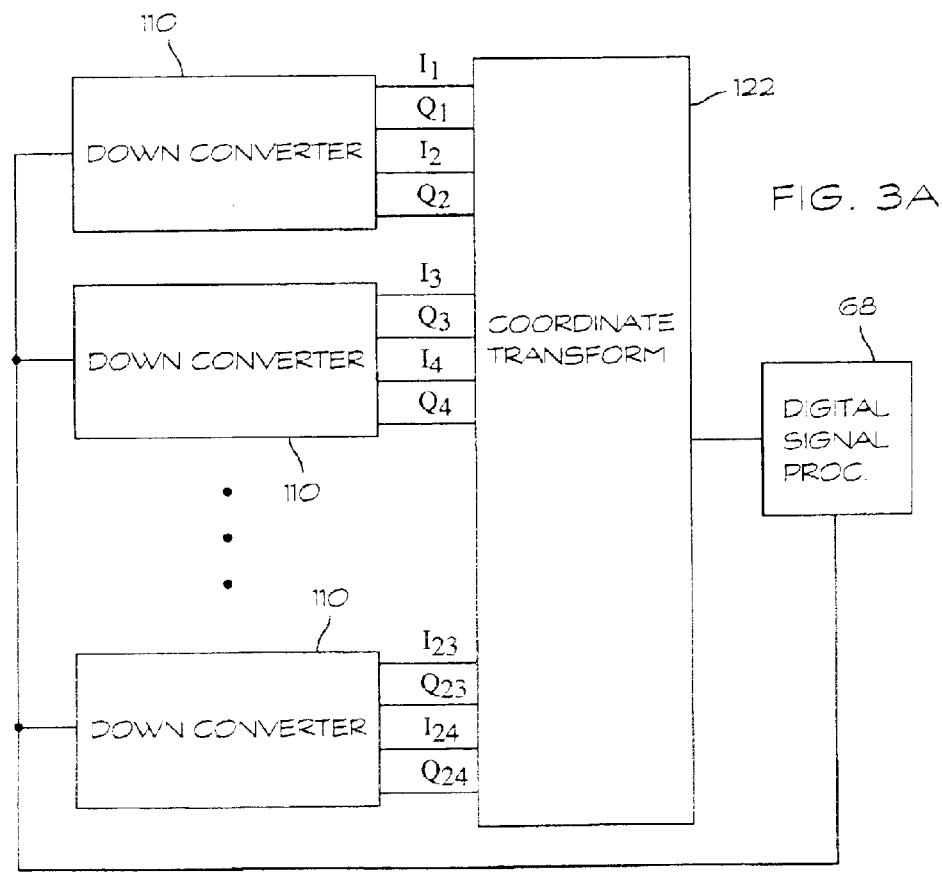
FIG. 3 is a block diagram of the apparatus of the present invention for processing signals output from the fiber optic sensor array of FIG. 1.
Figure 3B:
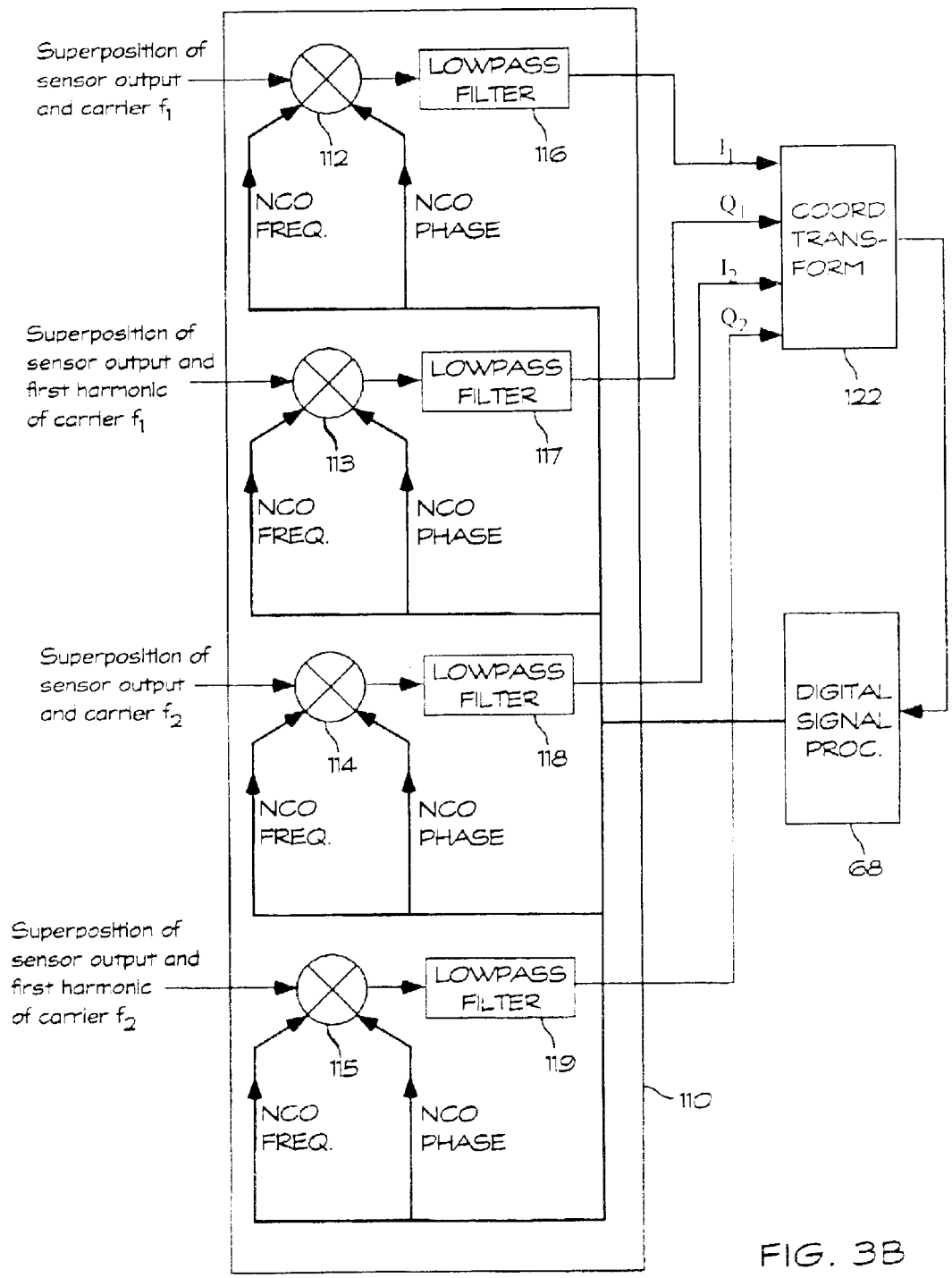

Referencing FIG. 3A, each channel of the output of the sensor system includes a digital down converter 110 that separates the acoustic signal from the phase generated carrier. The digital down converter 110 includes a plurality of mixers 112–115 shown in FIG. 3B. The mixers 112–115 receive signals from the sensor system 10.

The sensor system 10 uses phase generated carriers having frequencies $f_1$ and $f_2$. Each of the mixers 112–115 is connected to the system processor 68, which is a digital signal processor (DSP). The DSP 68 provides a first signal to each of the mixers 112–115 to indicate the NCO frequency. The NCO frequency signals preferably are 32 bit digital signals. The DSP 68 provides a second signal to each of the mixers 112–115 to indicate the NCO phase. The NCO phase signals preferably are 16 bit digital signals.

The input to the mixer 112 is a superposition of the sensor system 10 output and the carrier frequency $f_1$. The input to the mixer 113 is a superposition of the sensor system 10 output and the first harmonic of the carrier frequency $f_1$. The input to the mixer 114 is a superposition of the sensor system 10 output and the carrier frequency $f_2$. The input to the mixer 113 is a superposition of the sensor system 10 output and the first harmonic of the carrier frequency $f_2$.

The individual sensor responses are superimposed on the carrier and the carrier first harmonic, which are downconverted and filtered. The in-phase and quadrature components of the individual sensor responses are converted to polar phase by a coordinate transformer 122 by implementing an arctangent function.

The mixers 112–115 provide signal outputs to corresponding low pass filters 116–119. The output of the low pass filter 116 is a signal $I_1$ that indicates the in-phase signal component for the first carrier frequency $f_1$. The output of the low pass filter 117 is a signal $Q_1$ that indicates the quadrature signal component for the first carrier frequency $f_1$. The output of the low pass filter 118 is a signal $I_2$ that indicates the in-phase signal component for the second carrier frequency $f_2$. The output of the low pass filter 119 is a signal $Q_2$ that indicates the quadrature signal component for the second carrier frequency $f_2$.

The signals $I_1$, $Q_1$ output from the lowpass filters 116 and 117, respectively, are input to a coordinate transformer 122 that functions as a rectangular to polar converter. The signals $I_2$, $Q_2$ output from the lowpass filters 118 and 119, respectively, are also input to the coordinate transformer 122, which calculates the polar phase angle for each channel using the arctangent function. The coordinate transformer 122 provides signals that indicate the arctangents to the DSP 68, which determines the quadrant for each arctangent.

It should be noted that although only the carriers $f_1$ and $f_s$ are discussed in detail, the sensor system 10 as illustrated in FIG. 1 also includes carriers $f_3$, $f_4$, $f_5$ and $f_6$ that are arranged and processed in the same manner as described for the carriers $f_1$ and $f_2$. It should also be noted that the invention is not limited to any specific number of carriers.

The sensor output signals Q and I are sampled. As explained in greater detail below, the digital signal processor 68 sets the initial NCO phase offsets to maximize the amplitudes of Q and I coming out of the corresponding demodulator. The digital signal processor 68 then sets the depth of modulation in the corresponding optical signal source to produce a coarse quadrature relationship between the fundamental and first harmonic. The differences of the squares of successive values of Q and I are calculated and summed to produce differences values $D_{qs}$ and $D_{is}$. The phase modulator voltage is adjusted to keep the square root of the ratio $D_{qs}/D_{is}$ less than unity.

The processor then fine-tunes the quadrature relationship between the fundamental and first harmonic by balancing the gains of the in-phase and quadrature components of the demodulator output on a channel-by-channel basis. This is done by comparing the ratio of their peak values to unity and adjusting the gains of the signals Q and I are to maintain the signals at the same magnitude.

Figure 4A:
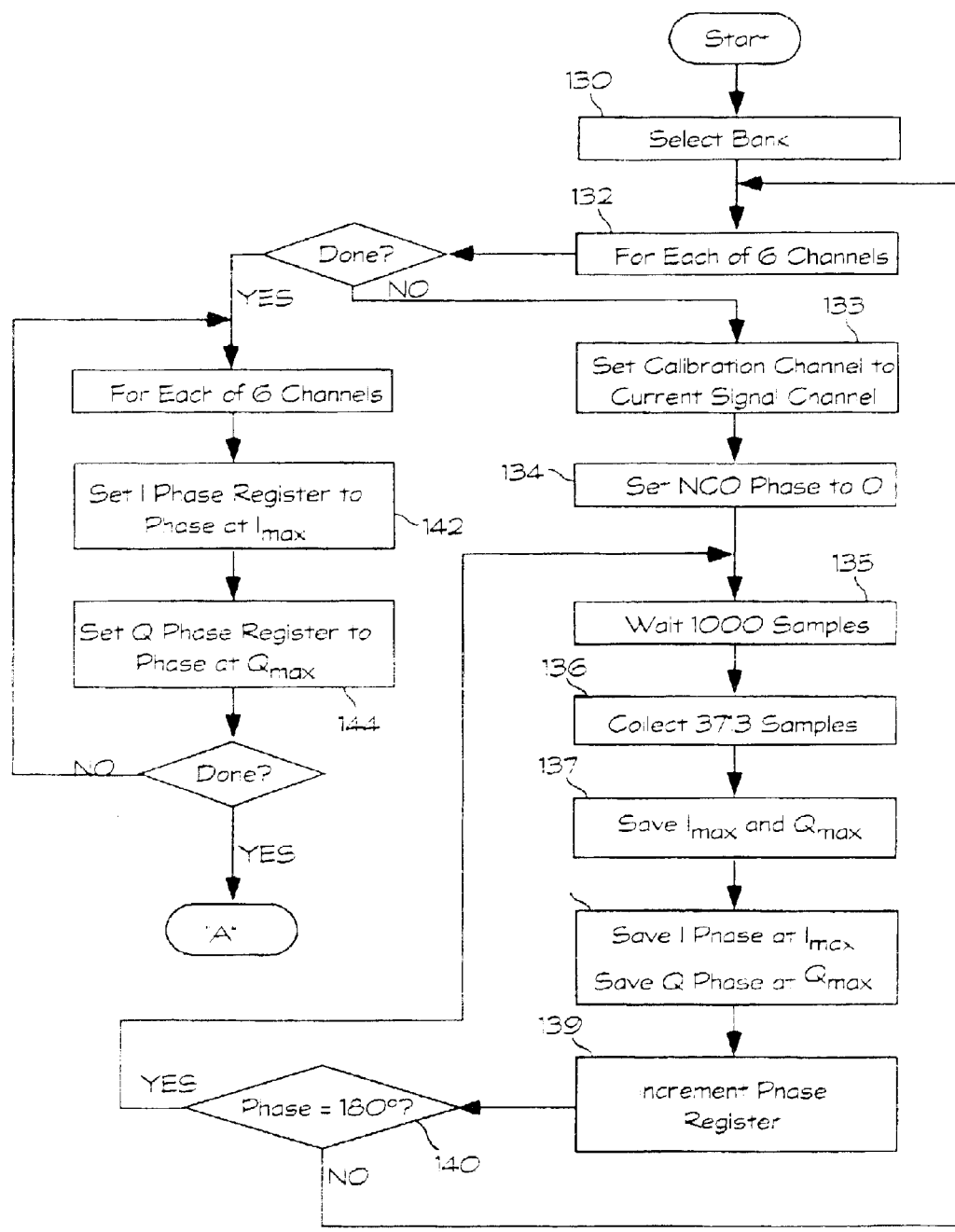
FIG. 4A is a flow chart of an algorithm used with the apparatus of FIG. 3 to eliminate uncertainty in the sign of the sensor response.
Figure 4B:
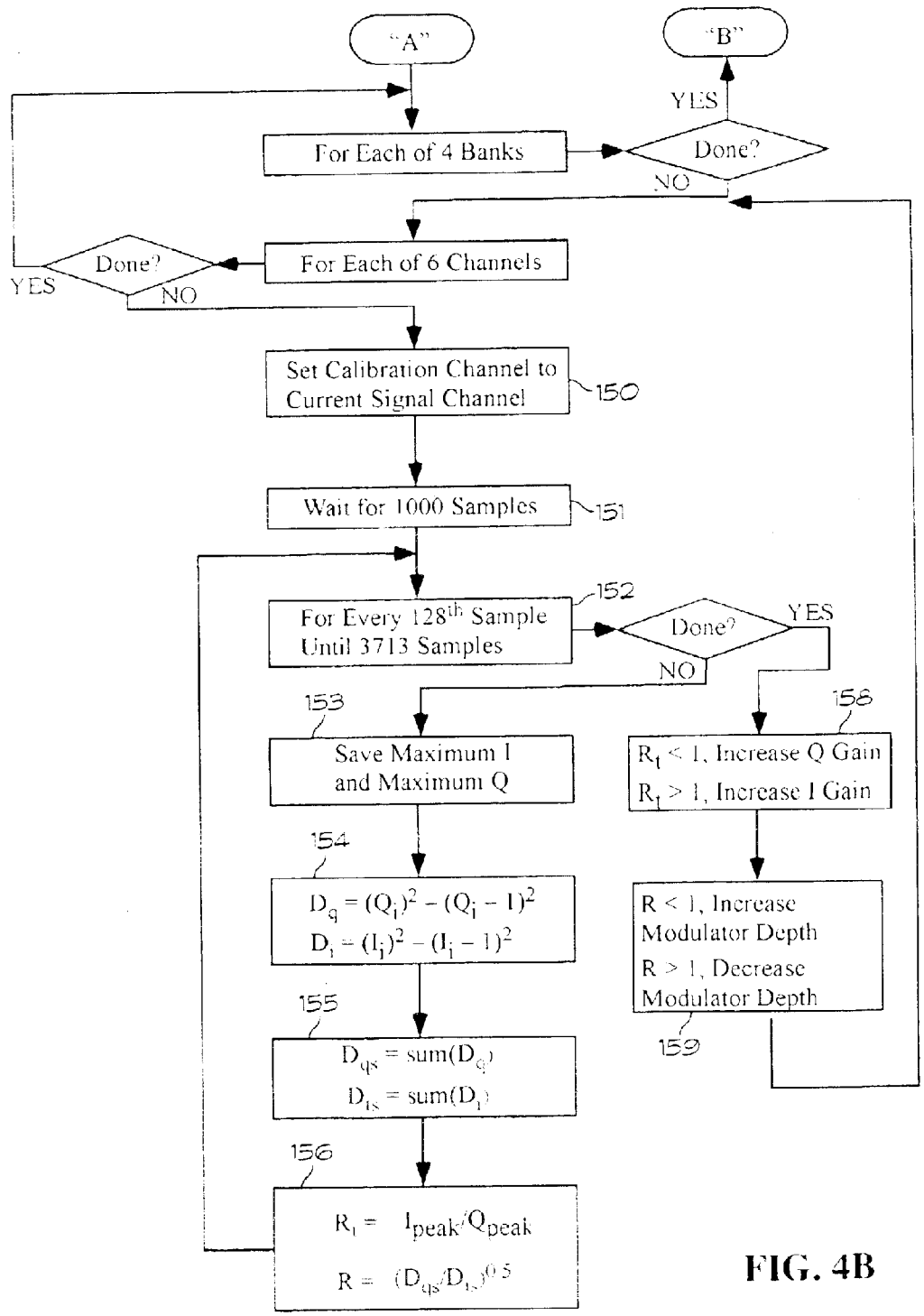
FIG. 4B is a flow chart illustrating additional details of the algorithm of FIG. 4A.

Referring to FIG. 4B, having established a true quadrature relationship between the fundamental and the first harmonic, the processor scans the arctangent output on a channel-by-channel basis. In the event the arctangent output of a particular channel is negative, the processor adds π radians (180°) of phase offset to the fundamental NCO frequency and adjusts the phase offset of the first harmonic NCO to maintain the quadrature relationship between the two.

FIG. 4A illustrates the details of an algorithm according to the invention for a sensor array that has four banks of interferometric sensors that each includes six sensor channels. After starting, the algorithm executes a select bank step 130 and repeats the select bank step 130 for each of six channels 132. A set calibration channel step 133 is then executed for each bank of sensors. The algorithm then proceeds with a set NCO phase to zero step 134. A wait step 135 then follows while a selected number of samples (e.g., 1000) are collected. The algorithm next has a collect samples step 136 in which a number of samples (e.g., 3713) are collected. A first save step 137 is executed in which maximum values of the in-phase component I and the quadrature phase component of the signal output from each sensor are saved. A second save step 138 is then performed in which the phase angles for the maximum values of the in-phase component I and the quadrature phase component are saved. The algorithm proceeds with an increment phase register step 139. A test phase step 140 then determines whether the stored phase is 180°. If the phase is 180°, the algorithm repeats the wait step 135 and following steps 136–140 until the phase is not 180°. If the phase is not 180°, the algorithm returns to step 132 and selects a new channel.

After steps 132–140 are completed for all six channels, then for each of the six channels the algorithm has a set I phase register step 142 in which an in-phase register is set to the phase corresponding to the maximum value $I_{max}$ of the in-phase component. The algorithm also includes a set Q phase step 144 in which a quadrature-phase register is set to the phase corresponding to the maximum value $Q_{max}$ of the quadrature phase component. After the steps 142 and 144 have been completed for all six channels in the selected bank, the algorithm proceeds with the steps shown in FIG. 4B.

Referencing FIG. 4B, the algorithm has a set calibration step 150 in which a calibration channel is set to the current signal channel. A wait step 151 is then performed for a number of samples (e.g., 1000) of the sensor output. After the wait step 151, the algorithm does a select sample step 152 in which samples are selected at a regular interval for further processing. For example, the select step 152 may select every $128^{th}$ sample until 3713 samples have been collected. As each sample is collected, a save step 153 is performed to save the maximum values of the in-phase component $I_{max}$ and the quadrature phase component $Q_{max}$ of the sensor output. The algorithm then proceeds with a differencing step 154 in which the difference between the squares of successive selected samples of the quadrature phase component $D_Q=(Q_i)^2-(Q_i-1)^2$ and the in-phase component $D_I=(I_i)^2-(I_i-1)^2$ are calculated. In the difference calculations the subscript "i" denotes the number of the selected sample for which calculations are being done.

The algorithm includes a summing step 144 in which sums $D_{Qs}$=sum($D_Q$) and $D_{Is}$=sum($D_I$) are calculated. These sums are input processed by a reference calculation step 156. The step 156 calculates a gain reference $$R_t = \frac{I_{peak}}{Q_{peak}}$$

and also calculates a modulation depth reference $$R = \left(\frac{D_{Qs}}{D_{IS}}\right)^{0.5}.$$

After steps 153–156 are executed for the selected number of samples, a gain adjust step 158 tests the gain reference $R_t$ to determine whether it is less than or greater than unity. If $R_t<1$, the gain is adjusted to increase the quadrature phase component Q. If the gain reference $R_t>1$, the gain is adjusted to increase the in-phase component I. A modulation depth step 159 is also done by comparing the modulation depth reference to unity. If modulator depth R<1, then the modulator depth is increased. If the modulator depth R>1, then the modulator depth is decreased.

Figure 4C:
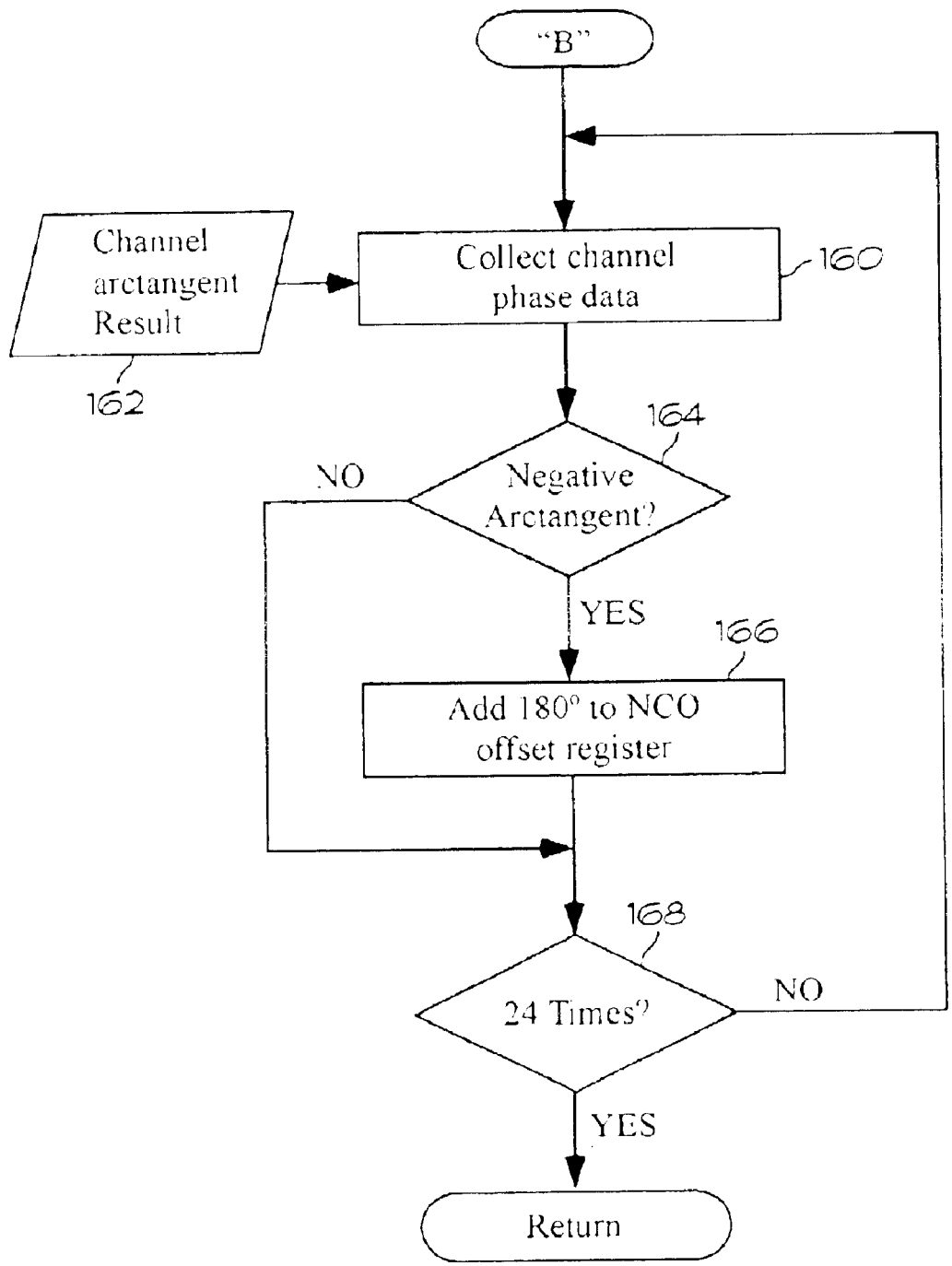
FIG. 4C is a flow chart illustrating additional details of the algorithm of FIG. 4B.

After these calculations have been completed for the entire sensor system 10, which may include four banks that each have six channels, the algorithm proceeds to execute the steps of FIG. 4C. Referencing FIG. 4C, a collect channel phase data step 160 receives the channel arctangent results 162. A test step 164 determines whether the arctangent is negative. If the arctangent is negative, an increment step 166 adds 180° to an offset register corresponding to the negative arctangent. If the arctangent is not negative, then a test step 168 determines whether all the arctangents for the sensor array 10 have been considered. For the particular sensor system 10 disclosed herein the steps 160, 162, 164 and 166 are performed twenty-four times.

The sensor output signals Q and I are sampled. The digital signal processor 68 sets the initial NCO phase offsets to maximize the amplitudes of Q and I coming out of the corresponding demodulator. The digital signal processor 68 then sets the depth of modulation in the correspond optical signal source to produce a coarse quadrature relationship between the fundamental and first harmonic. The differences of the squares of successive values of Q and I are calculated and summed to produce differences values $D_{qs}$ and $D_{is}$. The phase modulator voltage is adjusted to keep the square root of the ratio $D_{qs}/D_{is}$ less than unity.

The processor then fine-tunes the quadrature relationship between the fundamental and first harmonic by balancing the gains of the in-phase and quadrature components of the demodulator output on a channel-by-channel basis. This is done by comparing the ratio of their peak values to unity and adjusting the gains of the signals Q and I are to maintain the signals at the same magnitude.

Referring to FIG. 4B, having established a true quadrature relationship between the fundamental and the first harmonic, the processor scans the arctangent output on a channel-by-channel basis. In the event the arctangent output of a particular channel is negative, the processor adds π radians of phase offset to the fundamental NCO frequency and adjusts the phase offset of the first harmonic NCO to maintain the quadrature relationship between the two.

What is claimed is:

1. Apparatus for reducing sign uncertainty in a coherent phase generated carrier demodulator in an interferometric acoustic sensor system, comprising:

an optical signal source that provides a phase generated carrier signal to the interferometric acoustic sensor system so that the multi-channel acoustic sensor system produces an acoustic signal that is superimposed on the phase generated carrier signal, the interferometric acoustic sensor system being arranged to provide an optical signal output that includes the phase generated carrier signal and the acoustic signal;

a photodetector arranged to receive the optical signal output from the interferometric acoustic sensor system;

a downconverter connected to the photodetector, the downconverter being arranged to separate an in-phase component I and a quadrature component Q of the acoustic signal from the phase generated carrier signal; and a coordinate transformer connected to the downconverter, the coordinate transformer being arranged to function as a rectangular to polar converter and provide signals indicative of a polar phase angle between the in-phase component I and the quadrature phase component Q of the acoustic signal.

2. The apparatus of claim 1 wherein the coordinate transformer provides signals that indicate an arctangent of the polar phase angle between the in-phase component I and the quadrature phase component Q.

3. The apparatus of claim 1 wherein the interferometric acoustic sensor system comprises a multichannel interferometric sensor array.

4. The apparatus of claim 3, further comprising:

a photodetector array having a plurality of photodetectors arranged in corresponding relationship to the channels of the multichannel interferometric sensor array; and an array of downconverters connected to the photodetector array, the array of downconverters being arranged to separate the in-phase component I and the quadrature phase component Q of the acoustic signal from the phase generated carrier signal for each channel in the multichannel interferometric sensor array.

5. The apparatus of claim 1 wherein each downconverter in the array of downconverters comprises:

a first mixer arranged to receive a superposition of signals output from the sensor system and a the phase generated carrier signal that is input to the sensor array by the optical signal source to form the in-phase component I; and a second mixer arranged to receive a first harmonic of a superposition of signals output from the interferometric acoustic sensor system and the phase generated carrier signal to form the quadrature phase component Q.

6. The apparatus of claim 5, further comprising a plurality of optical signal sources connected to the multi-channel interferometric sensor array so that each channel therein receives a corresponding phase generated carrier signal.

7. The apparatus of claim 6 wherein each of the phase generated carrier signals has a unique carrier frequency.

8. The apparatus of claim 1, further comprising a digital signal processor is arranged to add 180° to each polar phase angle that is a negative number.

9. The apparatus of claim 8 wherein the digital signal processor is arranged to normalize the in-phase and quadrature signals.

10. A method for eliminating sign uncertainty in a coherent phase generated carrier demodulator in an interferometric acoustic sensor system, comprising the steps of:

arranging an optical signal source to provide a phase generated carrier signal to the acoustic sensor system so that the interferometric acoustic sensor system produces an acoustic signal that is superimposed on the phase generated carrier signal;

arranging the interferometric acoustic sensor system to provide an optical signal output that includes the phase generated carrier signal and the acoustic signal;

arranging a photodetector to receive the optical signal output from the interferometric acoustic sensor system;

connecting a downconverter to the photodetector;

arranging the downconverter to separate an in-phase component I and a quadrature component Q of the acoustic signal from the phase generated carrier signal; and connecting a coordinate transformer to the downconverter, the coordinate transformer being arranged to function as a rectangular to polar converter and provide signals indicative of a polar phase angle between the in-phase component I and the quadrature phase component Q of the acoustic signal.

11. The method of claim 10 including the step of arranging the coordinate transformer to provide signals that indicate an arctangent of a polar phase angle between the in-phase component I and the quadrature phase component for each channel.

12. The method of claim 10, further comprising the steps of:

adjusting a phase register in each downconverter in a predetermined number of phase intervals starting at 0° and ending at 180°;

sampling signals output from interferometric acoustic sensor system a predetermined number of times for each phase interval;

saving maximum values of the in-phase component I and the quadrature phase component Q;

saving phase values that correspond to the maximum values of the in-phase component I and the quadrature phase component Q; and setting the downconverter to the phase value that produced the stored maximum values of the in-phase component I and the quadrature phase component Q for the corresponding channel.

13. The method of claim 12, further comprising the steps of:

calculating the difference of successive squares of Q to determine a quantity $D_Q=(Q_i)^2-(Q_i-1)^2$;

calculating the difference of successive squares of Q to determine a quantity $D_I=(I_i)^2-(I_i-1)^2$;

summing the quantities $D_Q$ and $D_I$ to determine a sum term $D_{Qs}$ and a sum term $D_{Is}$;

calculating a quantity $$R = \left(\frac{D_{Qs}}{D_{Is}}\right)^{0.5};$$

adjusting the phase generated carrier gain by an amount proportional to 1−R; and repeating the preceding steps until R≦0.1

14. The method of claim 13, further comprising the steps of:

sampling signals output from the multichannel interferometric sensor array a predetermined number of times;

saving the maximum values of Q and I;

calculating the ratio $R_t$ of the maximum value of Q to the maximum value of I; and adjusting the signals Q and I if the ratio of their maximum values differs from unity.

15. The method of claim 12, further comprising the steps of:

arranging a first mixer to receive a superposition of signals output from the sensor system and a selected phase generated carrier signal having frequency that is input to the sensor array by the optical signal source to determine the in-phase component I; and arranging a second mixer to receive a harmonic of a superposition of signals output from the multichannel interferometric sensor array and the selected carrier signal.

16. The method of claim 15 further comprising the steps of connecting a digital signal processor to the coordinate transformer and arranging the digital signal processor to add 180° to each arctangent calculation that yields a negative number.

17. The method of claim 16, further comprising the steps of:

forming the interferometric acoustic sensor system as a multichannel interferometric sensor array;

providing a plurality of optical signal sources connected to the multi-channel acoustic sensor array so that each channel therein receives a corresponding phase generated carrier signal.

18. The method of claim 17, further comprising the step of connecting a plurality of optical signal sources to the multi-channel interferometric sensor array so that each channel therein receives a corresponding phase generated carrier signal.

19. The method of claim 18 further comprising the step of forming each of the phase generated carrier signals to have a unique carrier frequency.

* * * * *